United States Patent
Kim et al.

(10) Patent No.: US 8,867,648 B2
(45) Date of Patent: Oct. 21, 2014

(54) METHOD FOR REPORTING CHANNEL STATUS INFORMATION IN A MULTIANTENNA WIRELESS COMMUNICATION SYSTEM AND DEVICE FOR SAME

(75) Inventors: Hyungtae Kim, Anyang-si (KR); Hanbyul Seo, Anyang-si (KR); Daewon Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/885,152

(22) PCT Filed: Nov. 17, 2011

(86) PCT No.: PCT/KR2011/008799
§ 371 (c)(1),
(2), (4) Date: Sep. 4, 2013

(87) PCT Pub. No.: WO2012/081843
PCT Pub. Date: Jun. 21, 2012

(65) Prior Publication Data
US 2014/0010318 A1    Jan. 9, 2014

Related U.S. Application Data

(60) Provisional application No. 61/423,592, filed on Dec. 16, 2010.

(51) Int. Cl.
*H04B 7/02*      (2006.01)

(52) U.S. Cl.
USPC ........... 375/267; 375/299; 375/346; 375/347; 375/348; 375/260; 375/349; 455/517; 455/524; 455/101; 455/103; 455/500; 455/501; 455/63.1; 455/114.2; 455/134; 455/132; 455/135

(58) Field of Classification Search
USPC .............. 455/517, 524, 101, 103, 500, 63.1, 455/114.2, 134, 135, 501, 132.135; 375/267, 299, 346, 347, 348, 260, 349
See application file for complete search history.

(56) References Cited

U.S. PATENT DOCUMENTS 8,442,543 B2 * 5/2013 Shin et al. .................. 455/452.1
2010/0232539 A1 * 9/2010 Han et al. ...................... 375/285

(Continued)

OTHER PUBLICATIONS

R1-093780, "Estimation of extended PMI feedback signaling required for user intra-cell and inter-cell coordination", 3GPP TSG RAN WG1 #58bis Meeting, Oct. 16, 2009.
IEEE C80216m-09/0078r1, "MU-MIMO: Demodulation at the Mobile Station", Jan. 5, 2009.

(Continued)

*Primary Examiner* — Rahel Guarino
(74) *Attorney, Agent, or Firm* — Mckenna Long & Aldridge LLP

(57) ABSTRACT

The present application discloses a method for reporting channel status information in a multi antenna wireless communication system. In more detail, the method includes: receiving a reference signal from a base station; calculating the optimum precoding matrix index (PMI), at which the intensity of a signal from the base station is maximized, on the basis of the reference signal: determining at least one interference PMI from the base station on the assumption that a plurality of interference PMIs corresponding to the optimum PIM are applied; and transmitting information on at least one determined interference PMI to the base station. Beams corresponding to the plurality of interference PMIs are orthogonal to the beams corresponding to the optimum PMI.

8 Claims, 10 Drawing Sheets

(56) References Cited

U.S. PATENT DOCUMENTS

2010/0273514 A1    10/2010   Koo
2011/0128939 A1*    6/2011   Lim et al. ...................... 370/335
2012/0087435 A1*    4/2012   Gomadam et al. ............ 375/285
2012/0270535 A1*   10/2012   Chen et al. ................. 455/422.1

OTHER PUBLICATIONS

R1-093781, "Consideration on performance of coordinated beamforming with PMI feedback", 3GPP TSG RAN WG1 #58bis Meeting, Oct. 16, 2009.

* cited by examiner

FIG. 2
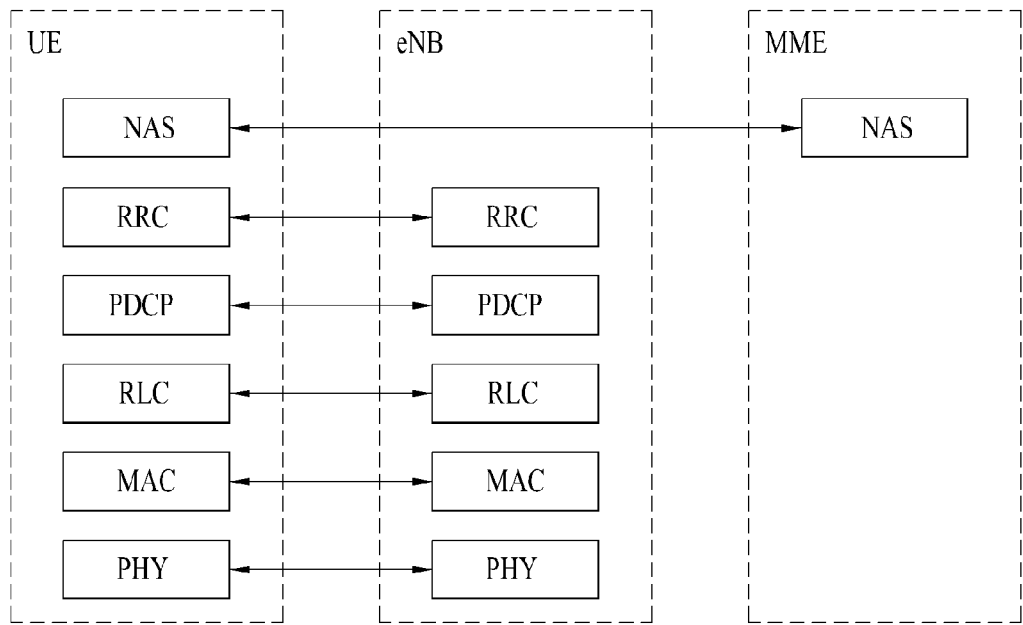
(a) Control-plane protocol stack
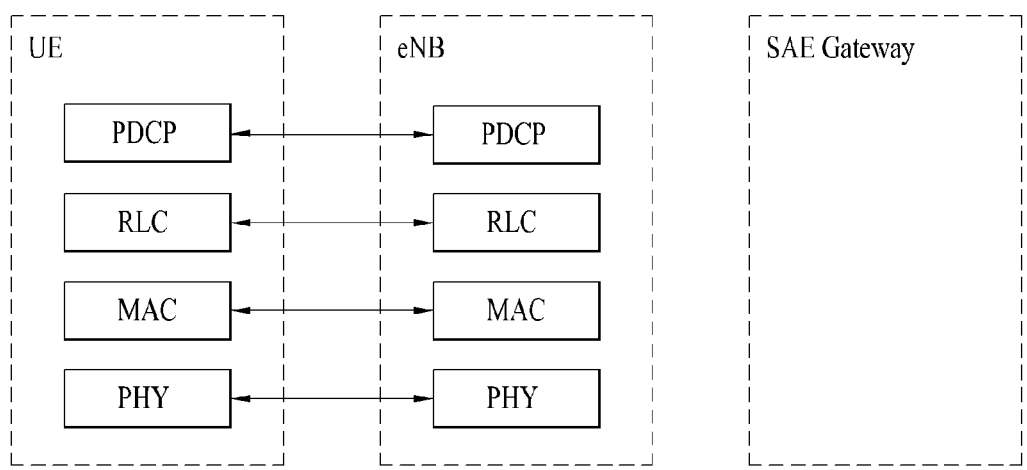
(b) User-plane protocol stack

METHOD FOR REPORTING CHANNEL STATUS INFORMATION IN A MULTIANTENNA WIRELESS COMMUNICATION SYSTEM AND DEVICE FOR SAME

This application is a 35 U.S.C. §371 National Stage Entry of International Application No. PCT/KR2011/008799, filed Nov. 17, 2011 and claims the benefit of U.S. Provisional Application No. 61/423,592, filed Dec. 16, 2010, all of which are incorporated by reference in their entirety herein.

TECHNICAL FIELD

The present invention relates to a wireless communication system, and more particularly, to a method of reporting a channel state information in a multi-antenna wireless communication system and apparatus therefor.

BACKGROUND ART

3GPP LTE ($3^{rd}$ generation partnership projecting long term evolution) communication system is schematically described for one example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '$3^{rd}$ Generation Partnership Project Technical Specification Group Radio Access Network' can be referred to.

Referring to FIG. 1, E-UMTS consists of a user equipment (UE) 120, base stations (eNode B: eNB) 110*a* and 110*b* and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

DISCLOSURE OF THE INVENTION

Technical Problem

Based on the above-mentioned discussion, a method of reporting a channel state information in a multi-antenna wireless communication system and apparatus therefor shall be proposed in the following description.

Technical Solution

To achieve these and other advantages and in accordance with the purpose of the present invention, as embodied and broadly described, a method of transmitting a channel state information, which is transmitted by a user equipment in a multi-antenna wireless communication system, according to one embodiment of the present invention may include the steps of receiving a reference signal from a base station, calculating a desired PMI (precoding matrix index) maximizing a signal strength from the base station based on the reference signal, determining at least one interference PMI having a small interference from the base station among a plurality of interference PMIs corresponding to the desired PMI on the assumption that applying a plurality of the interference PMI, and transmitting an information on the determined at least one interference PMI to the base station, wherein beams corresponding to a plurality of the interference PMIs are orthogonal to a beam corresponding to the desired PMI.

To further achieve these and other advantages and in accordance with the purpose of the present invention, as embodied and broadly described, in a multi-antenna wireless communication system, a user equipment according to one embodiment of the present invention may include a receiving module configured to receive a reference signal from a base station, a processor configured to calculate a desired PMI (precoding matrix index) maximizing a signal strength from the base station based on the reference signal, the processor configured to determine at least one interference PMI having a small interference from the base station among a plurality of interference PMIs corresponding to the desired PMI on the assumption that applying a plurality of the interference PMIs and a transmitting module configured to transmit an information on the determined at least one interference PMI to the base station, wherein beams corresponding to a plurality of the interference PMIs are orthogonal to a beam corresponding to the desired PMI.

Preferably, the information on the at least one interference PMI may include a 2-bit bitmap or a 3-bit bitmap. Preferably, if the determined at least one interference PMI includes two or more interference PMIs, the information on the interference PMI may indicate an average interference PMI of the two or more interference PMIs.

To further achieve these and other advantages and in accordance with the purpose of the present invention, as embodied and broadly described, a method of transmitting a channel state information, which is transmitted by a user equipment in a multi-antenna wireless communication system, according to another embodiment of the present invention may include the steps of receiving a reference signal from a base station by a preset period, calculating a desired PMI (precoding matrix index) for SU-MIMO (single user-multi input multi output) for maximizing a signal strength from the base station based on the reference signal, transmitting an information on the desired PMI for the SU-MIMO at a $1^{st}$ timing point in the preset period to the base station, and transmitting an information on a desired PMI for MU-MIMO (multi user-multi input multi output) and an information on an interference PMI corresponding to the desired PMI for the MU-MIMO to the base station, wherein a subspace spanned by the desired PMI for the SU-MIMO includes a subspace spanned by the desired PMI for the MU-MIMO and wherein a beam corresponding to the interference PMI is orthogonal to a beam corresponding to the desired PMI for the MU-MIMO.

To further achieve these and other advantages and in accordance with the purpose of the present invention, as embodied and broadly described, in a multi-antenna wireless communication system, a user equipment according to another embodiment of the present invention may include a receiving module configured to receive a reference signal from a base station by a preset period, a processor configured to calculate a desired PMI (precoding matrix index) for SU-MIMO (single user-multi input multi output) for maximizing a signal strength from the base station based on the reference signal, and a transmitting module configured to transmit an information on the desired PMI for the SU-MIMO at a $1^{st}$ timing point in the preset period to the base station, the transmitting module configured to transmit an information on a desired PMI for MU-MIMO (multi user-multi input multi output) and an information on an interference PMI corresponding to the desired PMI for the MU-MIMO to the base station, wherein a subspace spanned by the desired PMI for the SU-MIMO includes a subspace spanned by the desired PMI for the MU-MIMO and wherein a beam corresponding to the interference PMI is orthogonal to a beam corresponding to the desired PMI for the MU-MIMO.

Preferably, a rank corresponding to the desired PMI for the SU-MIMO may be greater than a rank corresponding to the desired PMI for the MU-MIMO.

Preferably, the information on the interference PMI may include a 2-bit bitmap or a 3-bit bitmap. Preferably, if at least two interference PMIs exist, the information on the interference PMI may indicate an average interference PMI of the at least two interference PMIs.

Advantageous Effects

According to an embodiment of the present invention, channel state information can be transmitted more efficiently in a multi-antenna wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram of structures of control and user planes of a radio interface protocol between a user equipment and E-UTRAN based on 3GPP radio access network specification.

BEST MODE FOR INVENTION

Figure 1:
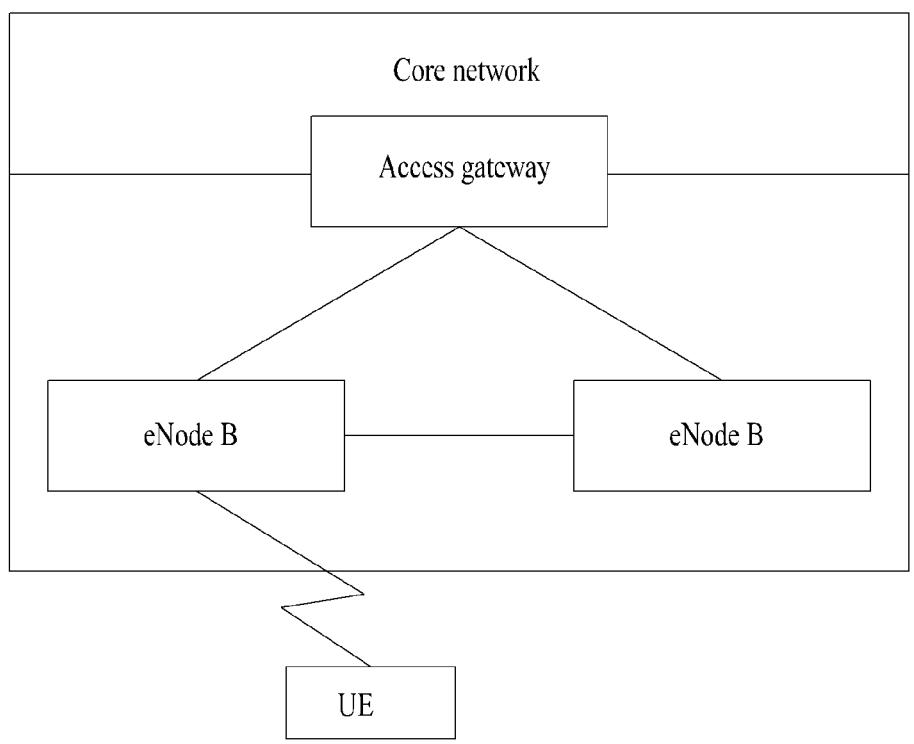
FIG. 1 is a schematic diagram of E-UMTS network structure as an example of a mobile communication system.

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

FIG. 2 is a diagram of structures of control and user planes of a radio interface protocol between a user equipment and E-UTRAN based on 3GPP radio access network specification. First of all, a control plane means a passage for transmitting control messages used by a user equipment and a network to manage a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer of the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network. In case that an RRC connection is established between an RRC layer of a user equipment and an RRC layer of a network, the user equipment is in a connected mode. Otherwise, the user equipment is in an idle mode. NAS (non-access stratum) layer above an RRC layer performs a function of session management, a function of mobility management and the like.

One cell, which constructs a base station (eNB), is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH). Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 3:
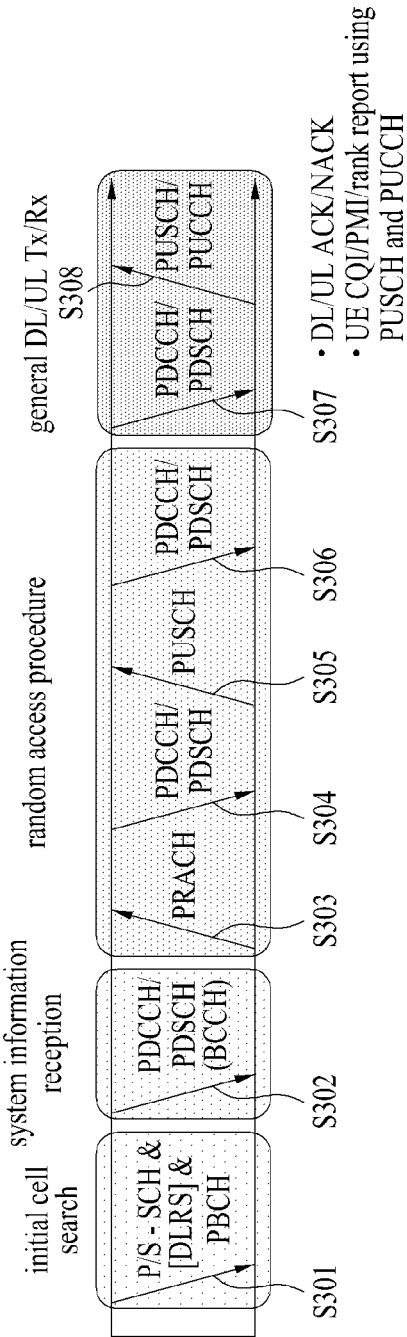
FIG. 3 is a diagram for explaining physical channels used for 3GPP system and a general method of transmitting a signal using the same.

FIG. 3 is a diagram for explaining physical channels used by 3GPP system and a general signal transmitting method using the same.

If a power of a user equipment is turned on or the user equipment enters a new cell, the user equipment performs an initial cell search for matching synchronization with a base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S302].

Meanwhile, if the user equipment initially accesses the base station or fails to have a radio resource for signal transmission, the user equipment is able to perform a random access procedure (RACH) on the base station [S303 to S306]. For this, the user equipment transmits a specific sequence as a preamble via a physical random access channel (PRACH) [S303, S305] and is then able to receive a response message via PDCCH and a corresponding PDSCH in response to the preamble [S304, S306]. In case of contention based RACH, it is able to perform a contention resolution procedure in addition.

Having performed the above mentioned procedures, the user equipment is able to perform PDCCH/PDSCH reception [S307] and PUSCH/PUCCH (physical uplink shared channel/physical uplink control channel) transmission [S308] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 4:
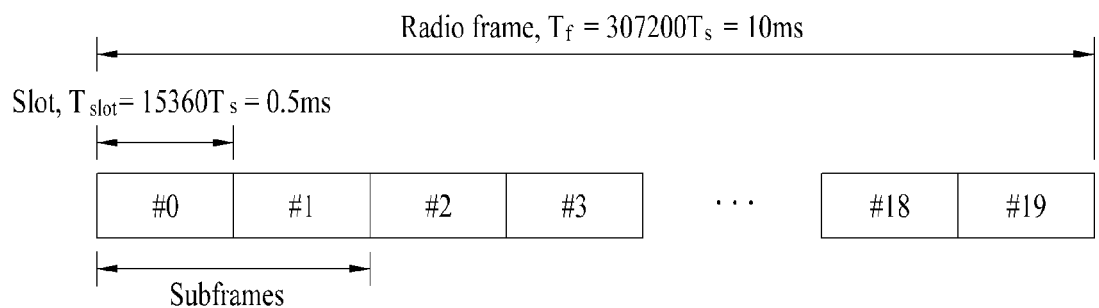
FIG. 4 is a diagram for an example of a structure of a radio frame used for LTE system.

FIG. 4 is a diagram for an example of a structure of a radio frame used by LTE system.

Referring to FIG. 4, a radio frame has a length of 10 ms ($327200 \times T_s$) and is constructed with 10 subframes in equal size. Each of the subframes has a length of 1 ms and is constructed with two slots. Each of the slots has a length of 0.5 ms ($15360 \times T_s$). In this case, $T_s$ indicates a sampling time and is expressed as $T_s=1/(15 \text{ kHz} \times 2048)=3.2552 \times 10^{-8}$ (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot can be modified in various ways.

Figure 5:
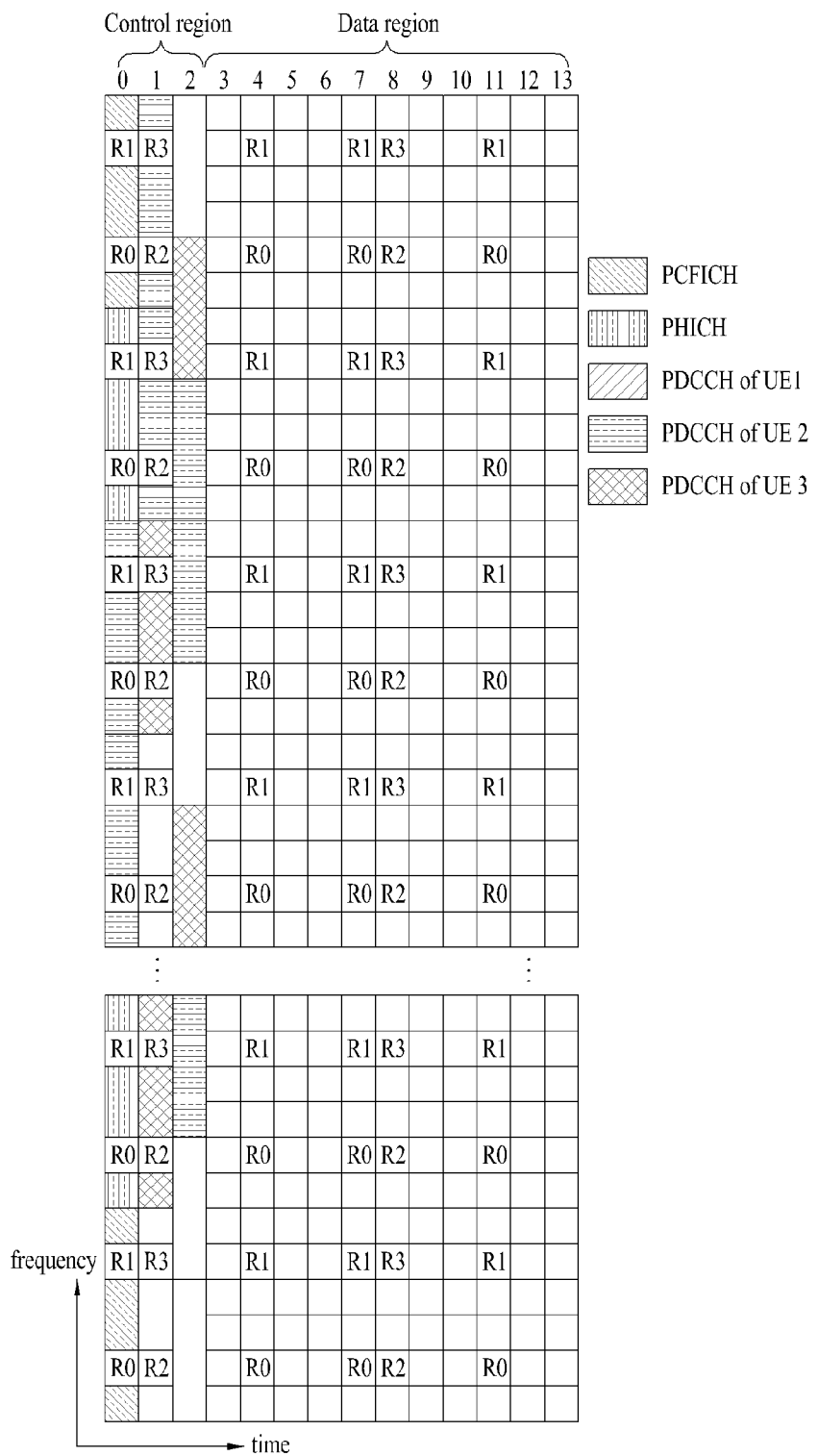
FIG. 5 is a diagram for one example of a structure of a downlink (DL) subframe used by LTE system.

FIG. 5 is a diagram for one example of a structure of a downlink (DL) subframe used by LTE system.

Referring to FIG. 5, a subframe may include 14 OFDM symbols. First 1 to 3 OFDM symbols may be used as a control region and the rest of 13 to 11 OFDM symbols may be used as a data region, in accordance with subframe configurations. In the drawing, R1 to R4 indicate reference signals (RS) for antennas 0 to 3, respectively. The RS may be fixed to a predetermined pattern in a subframe irrespective of the control region or the data region. The control region may be assigned to a resource, to which the RS is not assigned, in the control region. And, a traffic channel may be assigned to a resource, to which the RS is not assigned, in the data region. Control channels assigned to the control region may include PCFICH (Physical Control Format Indicator CHannel), PHICH (Physical Hybrid-ARQ Indicator CHannel), PDCCH (Physical Downlink Control CHannel) and the like.

The PCFICH is a physical control format indicator channel and informs a user equipment of the number of OFDM symbols used for PDCCH in each subframe. The PCFICH is situated at a first OFDM symbol and is set prior to the PHICH and the PDCCH. The PCFICH is constructed with four resource element groups (REGs). Each of the REGs is distributed within the control region based on a cell ID. One REG is constructed with four REs. In this case, the RE indicates a minimum physical resource defined as '1 subcarrier×1 OFDM symbol'. A value of the PCFICH indicates a value of '1~3' or '2~4' and is modulated by QPSK (quadrature phase shift keying).

The PHICH is a physical HARQ (hybrid-automatic repeat and request) indicator channel and is used in carrying HARQ ACK/NACK for uplink transmission. In particular, the PHICH indicates a channel for carrying DL ACK/NACK information for UL HARQ. The PHICH is constructed with 1 REG and is cell-specifically scrambled. The ACK/NACK is indicated by 1 bit and then modulated by BPSK (binary phase shift keying). The modulated ACK/NACK is spread by 'SF (spreading factor)=2 or 4'. A plurality of PHICHs mapped to the same resource configure a PHICH group. The number of the PHICHs multiplexed into the PHICH group is determined depending on the number of spreading codes. And, the PHICH (group) is repeated three times to obtain a diversity gain in frequency domain and/or time domain.

The PDCCH is a physical downlink control channel and is assigned to first n OFDM symbols of a subframe. In this case, 'n' is an integer equal to or greater than 1 and is indicated by the PCFICH. The PDCCH informs each user equipment or UE group of resource allocation information on transport channels PCH (paging channel) and DL-SCH (downlink-shared channel), uplink scheduling grant, HARQ information and the like. The PCH (paging channel) and the DL-SCH (downlink-shared channel) are carried on the PDSCH. Therefore, a base station or a user equipment normally transmits or receives data via the PDSCH except specific control information or specific service data.

Information indicating that data of the PDSCH is transmitted to a prescribed user equipment (or a plurality of user equipments), information indicating how the user equipments receive and decode PDSCH data, and the like are transmitted by being included in the PDCCH. For instance, assume that a specific PDCCH is CRC masked with RNTI (radio network temporary identity) 'A' and that information on data transmitted using a radio resource 'B' (e.g., frequency position) and transmission format information 'C' (e.g., transport block size, modulation scheme, coding information, etc.) is transmitted via a specific subframe. If so, at least one user equipment located in a corresponding cell monitors PDCCH using RNTI information of its own. If there is at least one user equipment having the RNTI 'A', the user equipments receive the PDCCH and then receive PDSCH indicated by 'B' and 'C' through the information of the received PDCCH.

Figure 6:
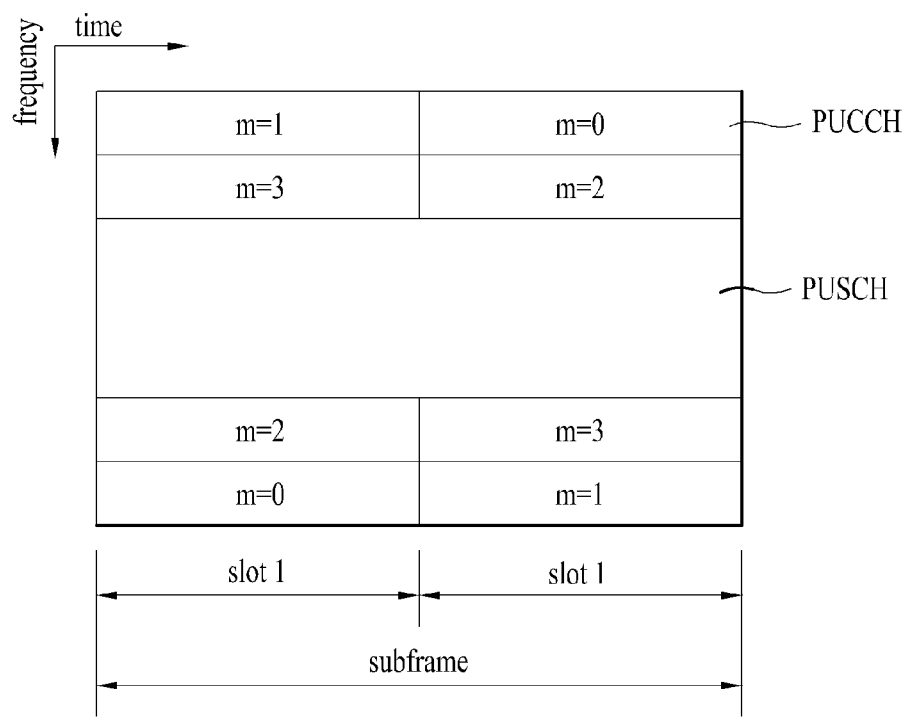
FIG. 6 is a diagram for one example of a structure of an uplink (UL) subframe used by LTE system.

FIG. 6 is a diagram for one example of a structure of an uplink (UL) subframe used by LTE system.

Referring to FIG. 6, a UL subframe may be divided into a region for assigning PUCCH (physical uplink control channel) configured to carry control information and a region for assigning PUSCH (physical uplink shared channel) configured to carry user data. A middle part of a subframe is assigned to the PUSCH and both side parts of a data region in frequency domain are assigned to the PUSCH. The control information carried on the PUCCH may include ACK/NACK used for HARQ, CQI (channel quality indicator) indicating a DL Channel state, an RI (rank indicator) for MIMO, an SR (scheduling request) that is a UL resource allocation request, and the like. The PUCCH for a single user equipment uses a single resource block occupying a different frequency in each slow within a subframe. In particular, a pair of resource blocks assigned to the PUCCH experience frequency hopping on a slot boundary. Specifically, FIG. 6 shows one example that PUCCH (m=0), PUCCH (m=1), PUCCH (m=2), and PUCCH (m=3) are assigned to the subframe.

In the following description, MIMO system is explained. First of all, MIMO (multi-input multi-output) is a method that uses a plurality of transmitting antennas and a plurality of receiving antennas. And, this method may be able to improve efficiency in transceiving data. In particular, a transmitting or receiving stage of a wireless communication system uses a plurality of antennas to increase capacity or enhance performance. In the following description, the MIMO may be called 'multiple antennas (multi-antenna)'.

The MIMO technology does not depend on a single antenna path to receive one whole message. Instead, the MIMO technique completes data by putting fragments received via several antennas together. If the MIMO technique is adopted, a data transmission rate within a cell area having a specific size may be improved or a system coverage may be increased by securing a specific data transmission rate. Moreover, this technique may be widely applicable to a mobile communication terminal, a relay and the like. According to the MIMO technique, it may be able to overcome the transmission size limit of the related art mobile communication which used to use a single data.

Figure 7:
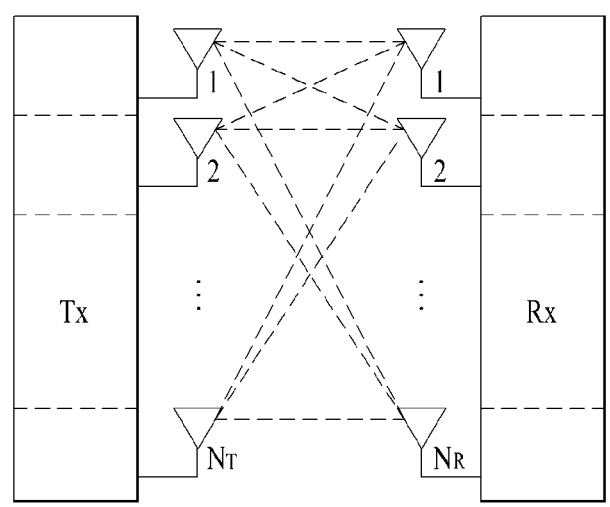
FIG. 7 is a diagram for a configuration of a general multi-antenna (MIMO) communication system.

FIG. 7 is a diagram for a configuration of a general multi-antenna (MIMO) communication system. $N_T$ transmitting antennas are provided to a transmitting stage, while $N_R$ receiving antennas are provided to a receiving stage. In case that each of the transmitting and receiving stages uses a plurality of antennas, theoretical channel transmission capacity is increased more than that of a case that either the transmitting stage or the receiving stage uses a plurality of antennas. The increase of the channel transmission capacity is in proportion to the number of antennas. Hence, a transmission rate is enhanced and frequency efficiency can be raised. Assuming that a maximum transmission rate in case of using a single antenna is set to $R_0$, the transmission rate in case of using multiple antennas may be theoretically raised by a result from multiplying the maximum transmission rate $R_0$ by a rate increasing rate $R_i$, as shown in Formula 1. In this case, $R_i$ is a smaller one of $N_T$ and $N_R$.

$$R_i = \min(N_T, N_R) \qquad \text{[Formula 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many ongoing efforts are made to various techniques to substantially improve a data transmission rate. And, these techniques are already adopted in part as standards for the 3G mobile communications and various wireless communications such as a next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Referring to FIG. 1, assume that $N_T$ transmitting antennas and $N_R$ receiving antennas exist. First of all, regarding a transmission signal, if there are $N_T$ transmitting antennas, $N_T$ maximum transmittable informations exist. Hence, the transmission information may be represented by the vector shown in Formula 2.

$$s=[s_1, s_2, \ldots, s_{N_T}]^T \quad \text{[Formula 2]}$$

Meanwhile, transmission powers can be set different from each other for transmission informations $S_1, S_2, \ldots, S_{N_T}$, respectively. If the transmission powers are set to $P_1, P_2, \ldots, P_{N_T}$, respectively, the transmission power adjusted transmission information can be represented as Formula 3.

$$\hat{s}=[\hat{s}_1, \hat{s}_2, \ldots, \hat{s}_{N_T}]^T = [P_1 s_1, P_2 s_2, \ldots, P_{N_T} s_{N_T}]^T \quad \text{[Formula 3]}$$

And, $\hat{S}$ may be represented as Formula 4 using a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Let us consider a case of configuring $N_T$ transmitted signals $x_1, x_2, \ldots, x_{N_T}$, which are actually transmitted, by applying a weight matrix W to a transmission power adjusted information vector $\hat{S}$. In this case, the weight matrix plays a role in properly distributing each transmission information to each antenna according to a transmission channel status and the like. The transmitted signals are set to $x_1, x_2, \ldots, x_{N_T}$ may be represented as Formula 5 using a vector X. In this case, $W_{ij}$ means a weight between an $i^{th}$ transmitting antenna and a $j^{th}$ information. And, the W may be called a weight matrix or a precoding matrix.

$$x = \begin{bmatrix} x_1 \\ x_2 \\ \vdots \\ x_i \\ \vdots \\ x_{N_T} \end{bmatrix} \quad \text{[Formula 5]}$$

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

Generally, a physical meaning of a rank of a channel matrix may indicate a maximum number for carrying different informations on a granted channel. Since a rank of a channel matrix is defined as a minimum number of the numbers of independent rows or columns, a rank of a channel is not greater than the number of rows or columns. For example by formula, a rank of a channel H (i.e., rank (H)) is limited by Formula 6.

$$\text{rank}(H) \leq \min(N_T, N_R) \quad \text{[Formula 6]}$$

Meanwhile, each different information sent by MIMO technology may be defined as 'transport stream' or 'stream' simply. This 'stream' may be called a layer. If so, the number of transport streams is unable to be greater than a channel rank, which is the maximum number for sending different informations. Hence, the channel matrix H may be represented as Formula 7.

$$\text{\# of streams} \leq \text{rank}(H) \leq \min(N_T, N_R) \quad \text{[Formula 7]}$$

In this case, '# of streams' may indicate the number of streams. Meanwhile, it should be noted that one stream is transmittable via at least one antenna.

Various methods for making at least one stream correspond to several antennas may exist. These methods may be described in accordance with a type of MIMO technique as follows. First of all, if one stream is transmitted via several antennas, it may be regarded as spatial diversity. If several streams are transmitted via several antennas, it may be regarded as spatial multiplexing. Of course, such an intermediate type between spatial diversity and spatial multiplexing as a hybrid type of spatial diversity and spatial multiplexing may be possible.

Meanwhile, it is expected that LTE-A system, which is the standard of a next generation mobile communication system, will support CoMP (coordinated multi point) transmission scheme unsupported by the previous standard in order to enhance a data transmission rate. In this case, the CoMP transmission scheme means a transmission scheme for enabling at least two base stations or cells to coordinately communicate with a user equipment to enhance communication performance between a base station (cell or sector) and a user equipment located in a radio shadow area.

The CoMP transmission scheme may be categorized into CoMP-JP (CoMP-Joint Processing) of a coordinated MIMO type through data sharing and CoMP-CS/CB (CoMP Coordinated Scheduling/Coordinated Beamforming).

In CoMP-JP for a case of a downlink, a user equipment can receive data from base stations, each of which performs the CoMP transmission, simultaneously and instantly and is then able to enhance reception performance by combining the signals received from the base stations together [Joint Transmission (JT)]. And, it is able to consider a method for one of the base stations, each of which performs the CoMP transmission, to transmit data to the user equipment at a specific timing point [Dynamic Pont Selection (DPS)]. On the other hand, in CoMP-CS/CB (CoMP Coordinated Scheduling/Coordinated Beamforming), a user equipment can instantly receive data from a single base station, and more particularly, from a serving base station by beamforming.

In CoMP-JP (CoMP-Joint Processing) for a case of an uplink, each base station can receive a PUSCH signal from a user equipment simultaneously [Joint Reception (JR)]. On the other hand, in CoMP-CS/CB (CoMP Coordinated Scheduling/Coordinated Beamforming), a single base station receives PUSCH only. In doing so, determination for using the CoMP-CS/CB (CoMP Coordinated Scheduling/Coordinated Beamforming) is made by coordinated cells (or base stations).

In the following description, channel station information (CSI) reporting is explained. First of all, two kinds of transmission schemes (i.e., open-loop MIMO operational without channel state information and closed-loop MIMO operational based on channel state information) exist in the current LTE standard. Especially, in the closed-loop MIMO, each of a user equipment and a base station can perform beamforming based on channel state information in order to obtain a multiplexing gain of MIMO antenna. In order to obtain the channel state information from the user equipment, the base station sends a reference signal to the user equipment and commands the user equipment to feed channel station information measured based on the reference signal back to the base station via PUCCH (physical uplink control channel) or PUSCH (physical uplink shared channel).

CSI can be mainly classified into three kinds of informations including RI (rank indicator), PMI (precoding matrix index) and CQI (channel quality indication). First of all, as mentioned in the foregoing description, the RI indicates rank information of a channel and means the number streams a user equipment can receive via the same frequency-time resource. Since the RI is determined by long term fading, it is fed back to a base station by periods longer than those of the PMI or CQI in general.

Secondly, the PMI is the value reflecting spatial property of a channel and indicates a precoding matrix index of a base station preferred by a user equipment with reference to such a metric as SINR and the like. Finally, the CQI is a value indicating a strength of a channel and means a reception SINR normally obtainable when a base station uses PMI.

In such an advanced communication system such as the LTE-A standard, additional multi-user diversity can be additionally obtained using MU-MIMO (multi-user MIMO). Since interference between user equipments multiplexed together in antenna domain exists in MU-MIMO, a presence or non-presence of accuracy of CSI may considerably affect not only interference of a user equipment having reported the CSI but also interference of another multiplexed user equipment. Therefore, the MU-MINO requires a CSI reporting more accurate than that of SU-MIMO.

Moreover, in case of CoMP JT, since several base stations coordinately sends the same data to a specific user equipment, a corresponding system can be theoretically regarded as an MIMO system in which antennas are geographically distributed. In particular, when MU-MIMO is operated in JT, channel state information of high accuracy is required to avoid interference between coordinately scheduled user equipments like the case of a single cell MU-MIMO. In case of CoMP CB, an elaborate channel state information is also required to avoid interference given to a serving cell by a neighbor cell. In order to increase accuracy of a channel state information feedback in general, an additional channel state information feedback reporting is required and such reporting is transmitted to a base station on PUCCH or PUSCH.

Meanwhile, in such a next generation communication standard as the LTE-A standard, such a transmission scheme as the multi-user MIMO (MU-MIMO), the CoMP transmission and the like has been proposed to achieve a high transmission rate. In order to this enhanced transmission scheme, it is necessary for a user equipment to feed various kinds of more complicated CSIs back to a base station.

For one example, in MU-MIMO, when a user equipment (UE-A) selects a PMI, a CSI feedback scheme, which is performed in a manner of feeding back a PMI of a co-scheduled UE (i.e., BCPMI (best companion PMI) as well as a desired PMI, is taken into consideration. In particular, the BCPMI, which gives less interference to the user equipment (UE-A) when the co-scheduled UE it as a precoder in a precoding matrix codebook, is calculated and then additionally fed back to a base station. The base station then schedules the user equipment (UE-A) and the co-scheduled UE, which is to be scheduled together with the user equipment (UE-A), by applying the MU-MIMO scheme.

The BCPMI feedback scheme can be mainly categorized into an explicit feedback and an implicit feedback depending on a presence or non-presence of a feedback payload.

First of all, a feedback payload inclusive explicit feedback scheme included in the feedback payload is explained. The explicit feedback means the scheme performed in a manner that a UE-A determines BCPMI in a precoding matrix codebook and then feeds the BCPMI back to a base station via a control channel. For instance, the UE-A selects an interference signal precoding matrix, by which an estimated SINR for a valid channel from a serving cell is made to become a maximum, from a codebook and then feeds back the selected matrix as a BCPMI value.

The advantage of the explicit feedback is to select and send a BCPMI more effective in removing interference. This is because a user equipment assumes each codeword in a codebook as an interference beam and then determines a most effect value for the interference removal as a BCPMI in comparison with such a metric as an SIMR and the like. Yet, since the number of candidates of the BCPMI increases in proportion to a codebook size, it may be disadvantageous in requiring a larger feedback payload size.

Secondly, a feedback payload non-inclusive implicit feedback scheme is explained. The implicit feedback means the scheme for determining a desired PMI and then determining a BCPMI corresponding to the desired PMI statically. In this case, it is preferable that the BCPMI is configured with vectors orthogonal to the determined desired PMI. This is because, since the desired PMI is determined in direction for maximizing a channel gain of a channel H to maximize a reception SINR, an interference signal is selected to avoid the direction of the desired PMI to provide effectiveness to interference alleviation.

In particular, if the channel H is analyzed into a plurality of independent channels by SVD (singular value decomposition), the above-mentioned BCPMI determining scheme can be further justified. A 4×4 channel H can be decomposed by SVD as Formula 8.

$$H = ULV^H = [u_1\ u_2\ u_3\ u_4] \begin{bmatrix} \lambda_1 & 0 & 0 & 0 \\ 0 & \lambda_2 & 0 & 0 \\ 0 & 0 & \lambda_3 & 0 \\ 0 & 0 & 0 & \lambda_4 \end{bmatrix} \begin{bmatrix} v_1^H \\ v_2^H \\ v_3^H \\ v_4^H \end{bmatrix}$$ [Formula 8]

In Formula 8, U and V indicate unitary matrixes, respectively. $u_i$, $v_i$ and $\lambda_i$ indicate a 4×1 left singular vector of the channel H, a 4×1 right singular vector of the channel H and a singular value, respectively and are sorted in descending order of $\lambda_i > \lambda_{i+1}$.

When a transmitting end and a receiving end use a transmit beamforming matrix V and a receive beamforming matrix $U''$, respectively, it is able to obtain all theoretically obtainable channel gains without loss.

In particular, when a rank is 1, if a transmit beamforming vector $v_1$ and a receive beamforming vector $u_1$, it is able to obtain a channel gain $|\lambda_i|^2$, which provides optimal performance in aspect of SNR. For instance, when a rank is 1, it is advantageous for a UE-A to select a precoding matrix most similar to $v_1$. If a desired PMI exactly matches the $v_1$, a received beam is set to $u_1$ and a transmitted beam of an interference signal is set in direction orthogonal to that of the desired PMI, whereby the interference signal can be completely removed without signal loss.

In case that a desired PMI actually has a slight difference from $v_1$ due to quantization error, a transmitted beam of an interference signal configured in direction orthogonal to the desired PMI is not identical to the beam orthogonal to the $v_1$ and may fail in completely removing the interference signal. Nonetheless, if the quantization error is small, it may help the interference signal control.

For example of the implicit feedback scheme, if a codebook shown I Table 1 is used, BCPMI can be represented as a vector index orthogonal to PMI in Table 1 and is shown in Table 2. In particular, when there are 4 transmitting antennas, assuming that a reception rank of a user equipment having fed back the PMI is 1, 3 vectors orthogonal to a desired PMI can be represented as 3 BCPMIs shown in Table 2.

For instance, if PMI=3, it is determined as BCPMI=0, 1, 2. Each of the PMI and the BCPMI indicates an index of a 4×1 vector codeword in a codebook. A base station regards the BCPMI set (i.e., BCPMI=1, 2, 3) as a precoder effective for interference removal and uses a portion or all of it as a precoder of a co-scheduled user equipment.

Since the desired PMI and the BCPMI set are arranged in one-to-one correspondence, as shown in Table 1 and Table 2, the implicit feedback scheme is advantageous in having no additional feedback overhead. Yet, due to the quantization error of the desired PMI, the BCPMI dependent on the desired PMI may have error from an optimal beam direction for interference removal as well.

For instance, if there is no quantization error in the example shown in Table 2, each of the 3 BCPMIs indicates an interference beam that can completely remove interference. Yet, if the error is present, a difference from an ideal interference beam is generated. Moreover, an error between each BCPMI and an interference beam may be constant in average but may rapidly vary at a specific moment. In particular, in case of a desired PMI=3, BCPMI 0, BCPMI 1 and BCPMI 2 may be effective in removing an interference signal in order. And, a base station, which is not aware of a relative error between the BCPMIs 0 to 1, may set an interference beam to the 'BCPMI=2' having the biggest error from the ideal interference beam.

1$^{st}$ Embodiment

As mentioned in the foregoing description, each of the explicit feedback and the implicit feedback has advantages and disadvantages. Therefore, the present invention proposes a method of generating and feeding back BCPMI resulting from the compromise between the two feedback schemes.

In Table 2, BCPMI indicates 3 beam vectors orthogonal to a desired PMI. As mentioned in the foregoing description, each of the 3 beam vectors may be effective or ineffective for the interference signal control depending on a presence or non-presence of the quantization error of the PMI. In an ideal environment free from the quantization error, the beam vector indicates an ideal beam vector giving no interference. Yet, in a real environment having the quantization error, the beam vector may have a difference from the ideal beam. Moreover, in case that a plurality of BCPMIs are implicitly determined, each of the 3 BCPMIs may have a different error from an ideal interference beam.

Therefore, the present invention proposes a method of determining a BCPMI set primarily, selecting a beam vector giving a less interference from the corresponding BCPMI set and then explicitly feeding back the selected beam vector.

Compared to the explicit feedback scheme, the proposed method has a lower feedback overhead since BCPMI candidates are limited to the BCPMI set explicitly determined on the basis of a desired PMI. Compared to the implicit feedback scheme, the proposed method enables a base station to perform an interference control more effectively because a BCPMI effective for an interference removal is reported only by being selected from the BCPMI set. In the following description, this is described in detail with reference to a detailed example.

TABLE 1

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

TABLE 2

| | SU MIMO rank-1 PMI | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| BCPMI | 1, 2, 3 | 2, 3, 0 | 3, 0, 1 | 0, 1, 2 | 5, 6, 7 | 6, 7, 4 | 7, 4, 5 | 4, 5, 6 | 9, 10, 11 | 10, 11, 8 | 11, 8, 9 | 8, 9, 10 | 13, 14, 15 | 14, 15, 12 | 15, 12, 13 | 12, 13, 14 |

First of all, if a rank of a desired PMI is 1, three BCPMIs (i.e., $BCPMI_1$, $BCPMI_2$ and $BCPMI_3$) existing in a BCPMI set are mapped into a bitmap form and are then fed back to a base station. Table 3 and Table 4 show examples of a 2-bit bitmap form and Table 5 show one example of a 3-bit bitmap form.

In case of using the 2-bit bitmap shown in Table 3, a UE selects a BCPMI for receiving smallest interference from the 3 BCPMIs via such a metric as an SINR and the like and then encodes the selected BCPMI by the bitmap shown in Table 3. For instance, if the $BCPMI_1$ is a value for giving a smallest interference among the 3 BCPMIs, '00' is fed back to a base station. Having received the '00', the base station uses the $BCPMI_1$, which can alleviate the interference most among the 3 BCPMIs, for MU-MIMO scheduling.

In case of using the 3-bit bitmap shown in Table 5, if the UE feeds '011' back to the base station, the base station only uses the $BCPMI_1$ and the $BCPMI_2$ among the 3 BCPMIs for MU-MIMO scheduling.

Meanwhile, in case that at least two BCPMIs are signaled, as shown in Table 4 and Table 5, a plurality of BCPMIs can be interpreted by one of two methods. First of all, each of a user equipment and a base station interprets each of the BCPMIs as an interference beam that gives a small interference. Secondly, each of a user equipment and a base station interprets an average of the BCPMIs as an interference beam that gives a small interference.

For instance, when the 3-bit bitmap shown in Table 5 is used, if the user equipment feeds '011' back to the base station, it indicates the $BCPMI_1$ and the $BCPMI_2$. In this case, according to the $1^{st}$ method, each of the $BCPMI_1$ and the $BCPMI_2$ indicates a beam vector that gives a small interference. In particular, when each of the $BCPMI_1$, the $BCPMI_2$ and the $BCPMI_3$ are used, the user equipment calculates a reception SINR or a received interference power and then feeds the $BCPMI_1$ and the $BCPMI_2$, each of which is equal to or smaller than a specific threshold value, back to the base station. Hence, the base station configures a beam of a co-scheduled user equipment (UE), which is scheduled together with the user equipment, as the $BCPMI_1$ or the $BCPMI_2$ and then performs an MU-MIMO transmission.

According to the $2^{nd}$ method, an interference beam is determined as an average of the $BCPMI_1$ and the $BCPMI_2$. In particular, the user equipment feeds back a BCPMI combination most similar to a beam direction having a smallest interference in the $BCPMI_1$, $BCPMI_2$, $BCPMI_3$ and all PMIs obtainable from averaging a plurality of BCPMIs among the 3 BCPMIs. Hence, the base station configures a beam of a co-scheduled user equipment (UE), which is scheduled together with the user equipment, as an average of the $BCPMI_1$ and the $BCPMI_2$ and then performs an MU-MIMO transmission.

TABLE 3

| 2 bit bitmap | Subset of BCPMIs |
|---|---|
| 00 | $BCPMI_1$ |
| 01 | $BCPMI_2$ |
| 10 | $BCPMI_3$ |
| 11 | reserved |

TABLE 4

| 2 bit bitmap | Subset of BCPMIs |
|---|---|
| 00 | $BCPMI_1$, $BCPMI_2$ |
| 01 | $BCPMI_2$, $BCPMI_3$ |
| 10 | $BCPMI_3$, $BCPMI_1$ |
| 11 | reserved |

TABLE 5

| 3 bit bitmap | Subset of BCPMIs |
|---|---|
| 000 | $BCPMI_1$ |
| 001 | $BCPMI_2$ |
| 010 | $BCPMI_3$ |
| 011 | $BCPMI_1$, $BCPMI_2$ |
| 100 | $BCPMI_1$, $BCPMI_3$ |
| 101 | $BCPMI_2$, $BCPMI_3$ |
| 110 | $BCPMI_1$, $BCPMI_2$, $BCPMI_3$ |
| 111 | Reserved |

Tables 3 to 5 show examples of a case of configuring 3 BCPMIs orthogonal to a desired PMI as a BCPMI set, by which the present invention may be non-limited. In case that N BCPMIs are configured as a BCPMI set, the present invention can be extensively applicable in accordance with the idea shown in Tables 3 to 5.

$2^{nd}$ Embodiment

Meanwhile, CSI-RS (channel state information-RS) among newly introduced reference signals in LTE-A system is used for the purpose of downlink channel measurement. As the number of transmitting antennas supported by the LTE-A system increases up to 8, if RS is transmitted on whole bands in each subframe, it may result in an excessive RS overhead. Hence, CSI-RS transmission is performed by periods of several milliseconds (msec) in LTE-A.

Figure 8:
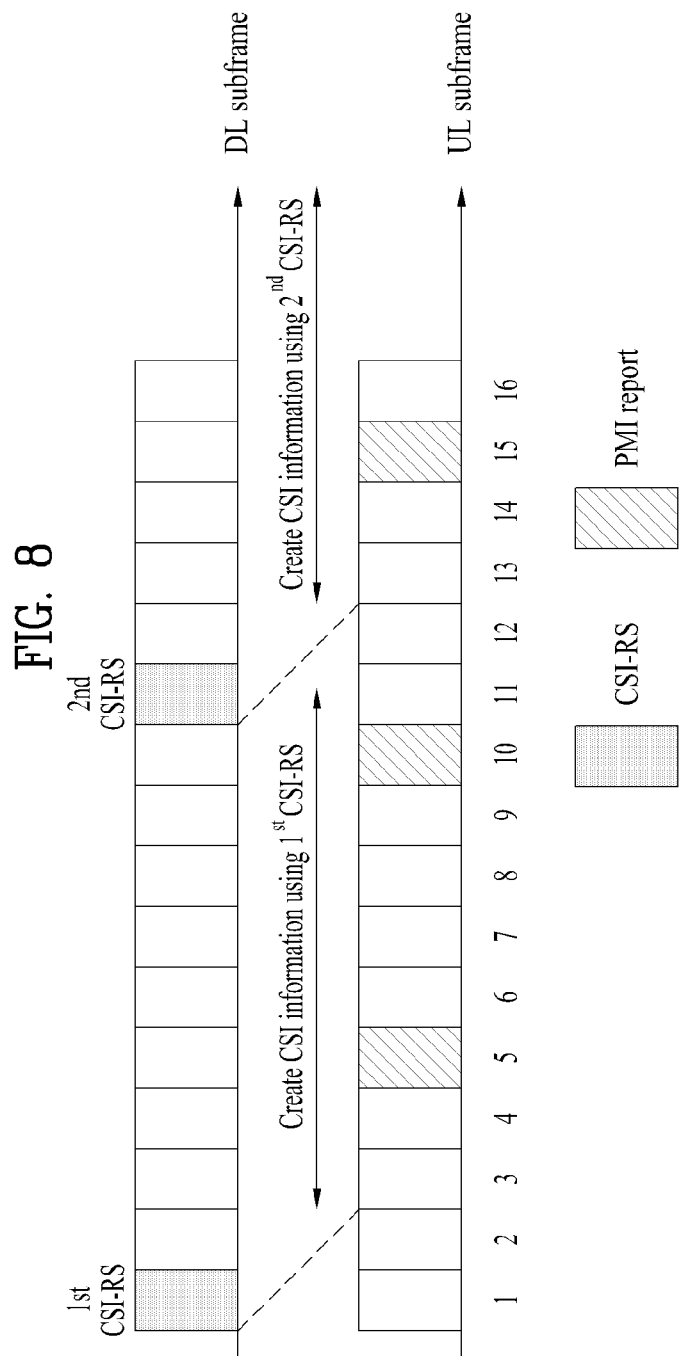
FIG. 8 is a diagram of a transmission pattern of a general CSI-RS and a feedback pattern of a PMI.

FIG. 8 is a diagram of a transmission pattern of a general CSI-RS and a feedback pattern of a PMI. In particular, in FIG. 8, assume that CSI-RS transmission is performed once in each 10 msec. And, assume that a user equipment transmits 2 PMIs in uplink (UL) for 10 msec.

Referring to FIG. 8, a user equipment measures a $1^{st}$ CSI-RS in a $1^{st}$ DL subframe, determines a PMI in $2^{nd}$ to $4^{th}$ subframes, and then feeds back the PMI in UL in a $5^{th}$ subframe. Thereafter, all PMIs fed back in a $10^{th}$ subframe are calculated with reference to the $1^{St}$ CSI-RS and PMI information is then generated and fed back with reference to a channel newly measured with a $2^{nd}$ CSI-RS in subframes starting with a $13^{th}$ subframe.

Hence, since the user equipment retains the same channel information, if PMI is selected by the same calculation method in each PMI cycle like the conventional method, the PMI fed back in the $5^{th}$ subframe is inevitably equal to the PMI fed back in the $10^{th}$ subframe, whereby control channel resources are wasted.

Therefore, the present invention proposes a method of feeding back a desired PMI for SU-MIMO and a PMI for MU-MIMO alternately in case of performing PMI feedbacks several times during a CSI-RS period. The PMI for MU-MIMO may include a desired PMI of a user equipment in MU-MIMO environment, BCPMI of a co-scheduled user equipment (co-scheduled UE), or both of the desired PMI and the BCPMI.

Figure 9:
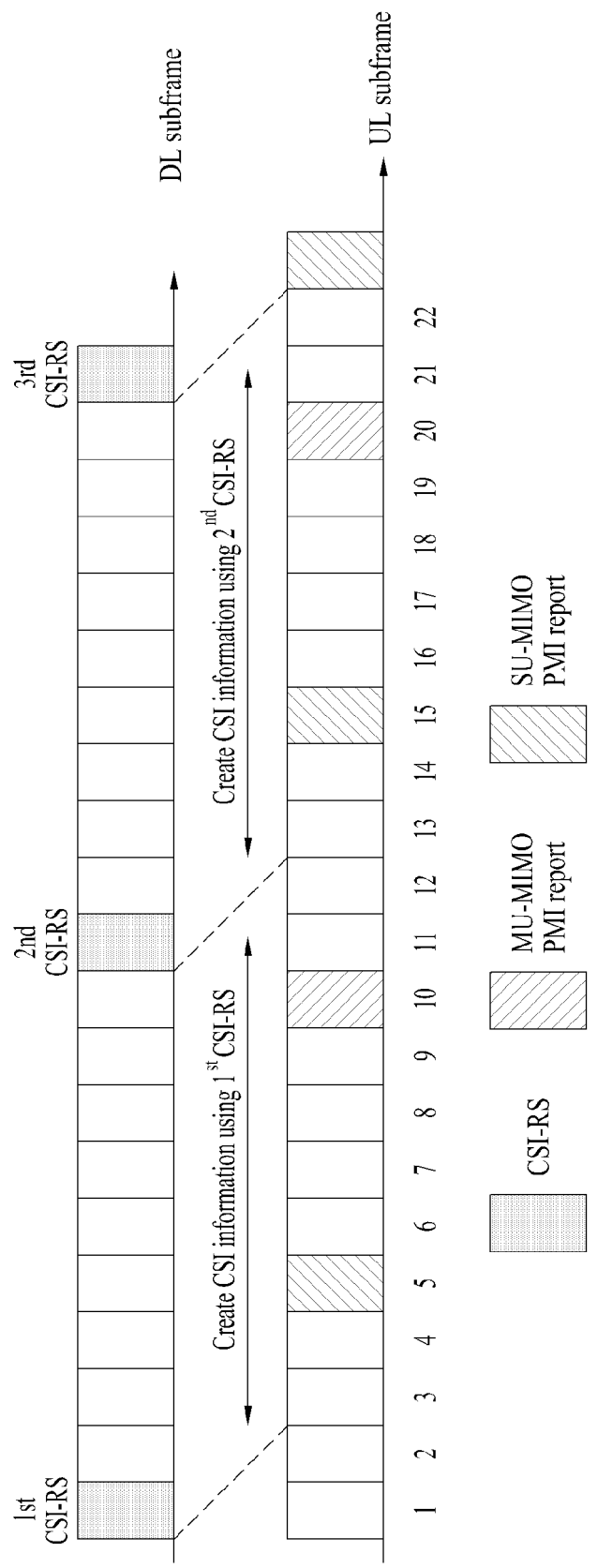
FIG. 9 is a diagram for one example of a PMI feedback scheme according to the present invention.

FIG. 9 is a diagram for one example of a PMI feedback scheme according to the present invention.

Referring to FIG. 9, a user equipment measures a $1^{st}$ CSI-RS in a $1^{st}$ DL subframe, determines a PMI in $2^{nd}$ to $4^{th}$ subframes, and then feeds back a previous desired PMI in aspect of SU-MIMO in UL in a $5^{th}$ subframe. Subsequently, the user equipment feeds back a PMI for MU-MIMO in a $10^{th}$ UL subframe. Thereafter, the user equipment feeds back a PMI for SU-MIMO and a PMI for MU-MIMO in a $15^{th}$ subframe and a $20^{th}$ subframe with reference to a channel newly measured with a $2^{nd}$ CSI-RS in subframes starting with a $13^{th}$ subframe, respectively.

The PMI for the MU-MIMO may include a value resulting from joint-encoding a desired PMI of a user equipment with a BCPMI of a user equipment co-scheduled with the former user equipment in MU-MIMO environment. For instance, if a PMI feedback payload size is 4 bits, 2 bits are used for the desired PMI and the rest (i.e., 2 bits) of the bits are usable in designating the BCPMI.

In MU-MIMO, since a spatial resource is generally used by several user equipments in a manner of being divided, a rank per user equipment is set to a low value such as 1 or 2 and this value is normally lower than a rank per user equipment of SU-MIMO. Theoretically, a subspace spanned by a desired PMI for SU-MIMO calculated at a high rank includes a subspace for MU-MIMO used at a low rank.

This is because, when a rank for SU-MIMO and a rank for MU-MIMO are set to N1 and N2 (N1>N2), respectively, a desired PMI for SU-MIMO obtainable by the singular value decomposition of Formula 8 and a desired PMI for MU-MIMO span a subspace of $v_1$ to $v_{N1}$ and a subspace of $v_1$ to $v_{N2}$, respectively.

Hence, a PMI set for MU-MIMO is configured with codewords close to a subspace spanned by a desired PMI for SU-MIMO, a desired PMI for MU-MIMO is found from the PMI set for MU-MIMO, and the found desired PMI can be then fed back. If so, it is able to reduce a feedback overhead without performance degradation as well.

For instance, when a rank per user equipment is limited to 1 in MU-MIMO and vectors $v_1$ and $v_2$ indicated by a desired PMI for SU-MIMO exist, the PMI set for MU-MIMO can be limited to 3 higher rank-1 codewords, each of which has a great norm in a subspace spanned by the vectors $v_1$ and $v_2$, or 3 higher rank-1 codewords each of which has a great norm on being projected into the subspace spanned by the vectors $v_1$ and $v_2$.

In the same manner, a PMI set for MU-MIMO can be configured with 3 codewords for each SU-MIMO PMI and mapped for every SU-MIMO PMI. The mapping relation is the information that can be known to a base station and a user equipment without separate signaling. Hence, in case that the user equipment configures a PMI set for MU-MIMO for a desired PMI, which is most recently fed back, for SU-MIMO using the mapping relation, the user equipment can feed it back to the base station using the bitmaps shown in Tables 6 to 8 in the following. For clarity of the following description, Tables 6 to 8 show the cases that the PMI set for MU-MIMO is configured with $MU-PMI_1$, $MU-PMI_2$ and $MU-PMI_3$.

In case that a plurality of PMIs are designated, as shown in Table 7 or Table 8, each PMI can be interpreted as an independent desired PMI or an average of PMIs can be operable by being interpreted as a desired PMI.

TABLE 6

| 2 bit bitmap | Subset of MU-PMIs |
| --- | --- |
| 00 | $MU-PMI_1$ |
| 01 | $MU-PMI_2$ |

TABLE 6-continued

| 2 bit bitmap | Subset of MU-PMIs |
| --- | --- |
| 10 | $MU-PMI_3$ |
| 11 | reserved |

TABLE 7

| 2 bit bitmap | Subset of MU-PMIs |
| --- | --- |
| 00 | $MU-PMI_1$, $MU-PMI_2$ |
| 01 | $MU-PMI_2$, $MU-PMI_3$ |
| 10 | $MU-PMI_3$, $MU-PMI_1$ |
| 11 | reserved |

TABLE 8

| 3 bit bitmap | Subset of MU-PMIs |
| --- | --- |
| 000 | $MU-PMI_1$ |
| 001 | $MU-PMI_2$ |
| 010 | $MU-PMI_3$ |
| 011 | $MU-PMI_1$, $MU-PMI_2$ |
| 100 | $MU-PMI_1$, $MU-PMI_3$ |
| 101 | $MU-PMI_2$, $MU-PMI_3$ |
| 110 | $MU-PMI_1$, $MU-PMI_2$, $MU-PMI_3$ |
| 111 | Reserved |

In particular, in case that 2 bits of a feedback payload are used as a desired PMI for MU-MIMO according to Table 6 or Table 7, the rest (i.e., 2 bits) of the bits can be used to feed back BCPMI. For instance, a base station and a user equipment can configure a BCPMI set based on SU-MIMO PMI and can feedback a specific BCPMI in the BCPMI set using the rest (i.e., 2 bits) of the bits.

For instance, referring to FIG. 9, after a base station has received SU-MIMO PMI and MU-MIMO PMI after a $10^{th}$ subframe, if the base station intends to perform MU-MIMO scheduling, the base station obtains an MU-MIMO PMI set and a BCPMI set explicitly determined on the basis of the SU-MIMO PMI. Thereafter, the base station decodes a bitmap of the MU-MIMO PMI, thereby confirming a desired PMI for MU-MIMO using upper 3 bits and obtaining BCPMI using lower 2 bits.

Figure 10:
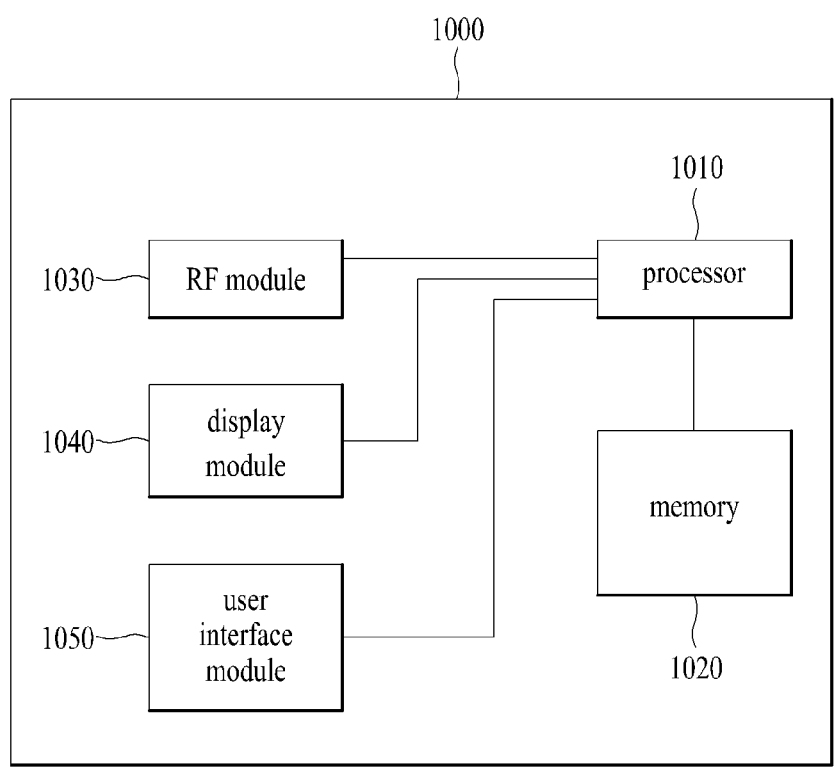
FIG. 10 is a block diagram for one example of a communication device according to one embodiment of the present invention.

FIG. 10 is a block diagram for one example of a communication device according to one embodiment of the present invention.

Referring to FIG. 10, a communication device 1000 includes a processor 1010, a memory 1020, an RF module 1030, a display module 1040 and a user interface module 1050.

The communication device 1000 is illustrated for clarity and convenience of the description and some modules can be omitted. Moreover, the communication device 1000 is able to further include at least one necessary module. And, some modules of the communication device 1000 can be further divided into sub-modules. The processor 1010 is configured to perform operations according to the embodiment of the present invention exemplarily described with reference to the accompanying drawings. In particular, the detailed operations of the processor 1010 can refer to the contents described with reference to FIGS. 1 to 9.

The memory 1020 is connected to the processor 1010 and stores operating systems, applications, program codes, data and the like. The RF module 1030 is connected to the processor 1010 and performs a function of converting a baseband signal to a radio signal or converting a radio signal to a baseband signal. For this, the RF module 1030 performs analog conversion, amplification, filtering and frequency uplink transform or inverse processes thereof. The display module 1040 is connected to the processor 1010 and displays various kinds of informations. The display module 1040 can include such a well-known element as LCD (Liquid Crystal Display), LED (Light Emitting Diode), OLED (Organic Light Emitting Diode) and the like, by which the present invention is non-limited. The user interface module 1050 is connected to the processor 1010 and can include a combination of well-known interfaces including a keypad, a touchscreen and the like.

The above-described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of 'what is claimed is' or that those claims can be included as new claims by revision after filing an application.

In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other network nodes except the base station. In this case, 'base station' can be replaced by such a terminology as a fixed station, a Node B, an eNode B (eNB), an access point and the like.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of reporting a channel state information in a multi-antenna wireless communication system and apparatus therefor are described mainly with reference to examples applied to 3GPP LTE system, as mentioned in the foregoing description, the present invention is applicable to various kinds of wireless communication systems as well as the 3GPP LTE system.

What is claimed is:

1. A method of transmitting a channel state information, which is transmitted by a user equipment in a multi-antenna wireless communication system, comprising the steps of:
    receiving a reference signal from a base station by a preset period;
    calculating a desired PMI (precoding matrix index) for SU-MIMO (single user-multi input multi output) for maximizing a signal strength from the base station based on the reference signal;
    transmitting an information on the desired PMI for the SU-MIMO at a 1st timing point in the preset period to the base station; and
    transmitting an information on a desired PMI for MU-MIMO (multi user-multi input multi output) and an information on an interference PMI corresponding to the desired PMI for the MU-MIMO to the base station,
    wherein a subspace spanned by the desired PMI for the SU-MIMO includes a subspace spanned by the desired PMI for the MU-MIMO and
    wherein a beam corresponding to the interference PMI is orthogonal to a beam corresponding to the desired PMI for the MU-MIMO.

2. The method of claim 1, wherein a rank corresponding to the desired PMI for the SU-MIMO is greater than a rank corresponding to the desired PMI for the MU-MIMO.

3. The method of claim 1, wherein the information on the interference PMI comprises either a 2-bit bitmap or a 3-bit bitmap.

4. The method of claim 1, wherein if at least two interference PMIs exist, the information on the interference PMI indicates an average interference PMI of the at least two interference PMIs.

5. In a multi-antenna wireless communication system, a user equipment comprising:
    a receiving module configured to receive a reference signal from a base station by a preset period;
    a processor configured to calculate a desired PMI (precoding matrix index) for SU-MIMO (single user-multi input multi output) for maximizing a signal strength from the base station based on the reference signal; and
    a transmitting module configured to transmit an information on the desired PMI for the SU-MIMO at a 1st timing point in the preset period to the base station, the transmitting module configured to transmit an information on a desired PMI for MU-MIMO (multi user-multi input multi output) and an information on an interference PMI corresponding to the desired PMI for the MU-MIMO to the base station,
    wherein a subspace spanned by the desired PMI for the SU-MIMO includes a subspace spanned by the desired PMI for the MU-MIMO and
    wherein a beam corresponding to the interference PMI is orthogonal to a beam corresponding to the desired PMI for the MU-MIMO.

6. The user equipment of claim 5, wherein a rank corresponding to the desired PMI for the SU-MIMO is greater than a rank corresponding to the desired PMI for the MU-MIMO.

7. The user equipment of claim 5, wherein the information on the interference PMI comprises either a 2-bit bitmap or a 3-bit bitmap.

8. The user equipment of claim 5, wherein if at least two interference PMIs exist, the information on the interference PMI indicates an average interference PMI of the at least two interference PMIs.

* * * * *